June 4, 1968  HIDEYASU MUROOKA  3,387,076
METHODS OF MOLDING PLASTIC OBJECTS WITH INSERTS
Filed Aug. 9, 1965
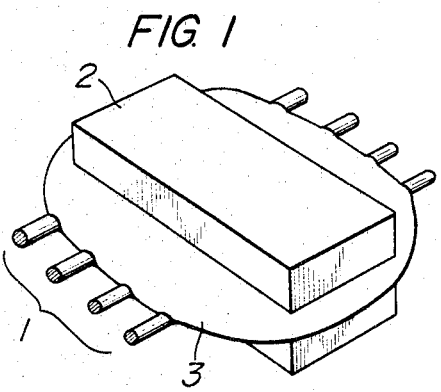
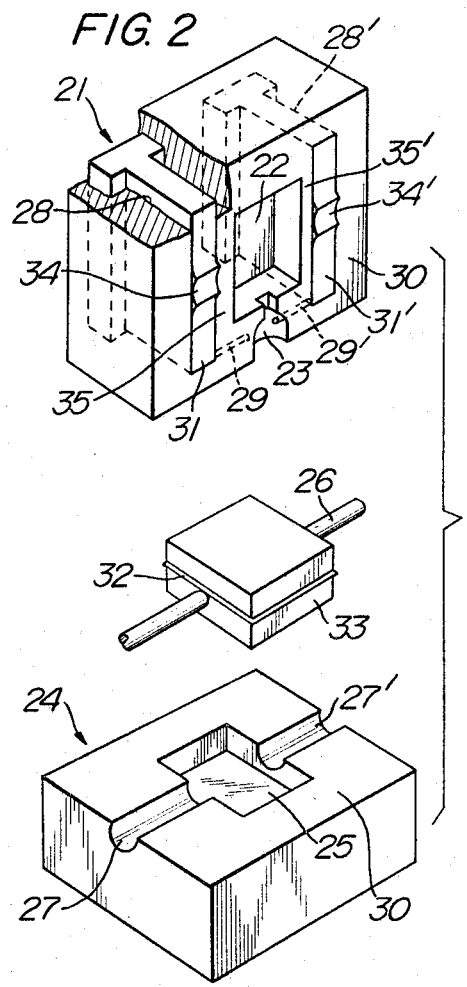
INVENTOR
Hideyasu Murooka
BY Paul M. Craig, Jr.
ATTORNEY

# United States Patent Office 3,387,076
Patented June 4, 1968

3,387,076
METHODS OF MOLDING PLASTIC OBJECTS WITH INSERTS
Hideyasu Murooka, Yokohama, Japan, assignor to Hitachi, Ltd., Tokyo, Japan
Filed Aug. 9, 1965, Ser. No. 478,114
Claims priority, application Japan, Aug. 14, 1964, 39/45,595
1 Claim. (Cl. 264—276)

ABSTRACT OF THE DISCLOSURE

The present disclosure relates to an improved method and apparatus for molding objects made of synthetic materials wherein flash-restraining members comprising, for example, synthetic polymers or soft metal are embedded in a one-half section of a two-piece mold in the vicinity of the cavity formed therein, for the purpose of stopping up the clearances usually formed along the parting line of the mold and between the inserts and the walls of the insert-receiving grooves communicating with the mold cavity.

---

The present invention relates to methods of molding plastic objects with inserts.

In molding plastic objects with inserts, flashing generally takes place along the parting line between the mold parts and along the insert-receiving grooves formed in the mold. For removal of flash, no satisfactory devices or procedures have previously been proposed and molders have usually been compelled to take makeshift measures for the purpose despite the inefficiency and inaccuracy involved therein.

The present invention has for its object to minimize the flashing of molding material during molding operation thereby to eliminate or reduce the need of removing flash from molded products.

According to the present invention, the object is attained by embedding flash-restraining members of an appropriate material such as synthetic resin or soft metal in one half section of a two-piece mold in the vicinity of the cavity formed therein for the purpose of stopping up the clearances usually formed along the parting line of the mold and between the inserts and the walls of the insert-receiving grooves communicating with the mold cavity.

The above and other objects, features and advantages of the present invention will become apparent from the following description when taken in conjunction with the accompanying drawings, in which:

FIG. 1 is a perspective view illustrating a molded article with inserts embedded therein and as produced by a conventional method; and FIG. 2 is a perspective illustration of a two-piece mold embodying the present invention and a molded article obtained by use of the mold.

Referring to the drawings and first to FIG. 1, which illustrates the molded wire-terminal section of a wire spring relay, reference numeral 1 indicates a plurality of wire conductors embedded in the molded section 2, which carries fins 3 around its periphery. This relay section is a molded product obtained by use of a conventional two-piece metal mold, which has formed therein a molding cavity and insert-receiving grooves communicating therewith. In use, the two halves of the metal mold are laid one on the other in registry with each other and molten molding material is loaded under pressure through an appropriate runner formed in the mold to form a molded section 2 with wire conductors 1 securely embedded therein. As illustrated, fins 3 are formed along the parting line between the mold parts and along the inserts or embedded wire conductors and constitute a source of trouble as pointed out hereinbefore.

According to the present invention, such flashing of molding material along the parting line of the mold and the insert-receiving grooves formed therein is effectively prevented. One form of metal mold embodying the present invention is illustrated in FIG. 2. In this figure, reference numeral 21 indicates the upper half of the two-piece mold formed with a cavity recess 22 and a main runner 23 communicating therewith. Reference numeral 24 indicates the lower mold section, formed with a cavity recess 25 and grooves 27, 27' for receiving inserts 26. The upper mold section 21 is also formed with a pair slots 28 and 28' T-shaped in cross section for the purpose of restraining flashing and also with auxiliary runners 29 and 29' interconnecting the main runner 23 and the respective T-slots 28 and 28'. Reference numerals 30 and 30' indicate the faces of the respective mold sections 21 and 24, which are brought together into direct contact with each other to form the parting line of the mold.

As illustrated, the T-slots 28 and 28' in the upper half of the mold are filled with an appropriate material such as synthetic resin or soft metal to form flash restrainers 31 and 31' including raised portions 34 and 34', respectively. The flash restrainers 31 and 31' are spaced by a definite distance from the adjacent edges of the cavity recess 22 as indicated at 35 and 35', respectively.

Reference numeral 33 indicates a molded relay section having inserts 26 embedded therein, which has been removed from the mold and carries a minimum of flash as indicated at 32.

The cavity recess 22 in the upper mold section 21 is located substantially in its center, has an appropriate configuration to form the desired molded article, and is closed at one side to form a non-clear hole. The spaces 35 and 35' of the T-slots 28 and 28' from the respective adjacent edges of the cavity recess 22 should be limited as much as possible with the metal mold structure. In the case where the mold is made of steel, it has been found that the spaces 35 and 35' may be reduced to the order of 0.8 mm. while ensuring the mechanical strength required of the mold section.

The lower half 24 of the mold is apparently formed of the same material as the upper mold half and the cavity recess 25 in the former is located and formed so as to register with the cavity recess 22 in the upper mold section when the two mold sections are brought together in registry with each other. The insert-receiving grooves 27 and 27' in the lower mold section 24 are arranged to extend from the respective outer edges of the mold section to the opposite edges or sides of the cavity 25.

Description will next be made on the molding procedure employing the two-piece metal mold described above.

First, the inserts 26 are placed in the grooves 27 and 27' formed in the lower mold section 24, the upper section 21 is then placed on the latter 24, and the mold sections are clamped together so that the opposing faces 30 and 30' are pressed against each other under a uniform pressure over the entire contacting area.

Subsequently, molten synthetic resin is introduced through the main runner 23 to fill up the mold cavity, which is defined by the recesses 22 and 25 joined together, and the T-slots 28 and 28' by way of the auxiliary runners 29, 29'. On this introduction, the molten resin usually flashes or penetrates along the parting line 30–30' of the mold and into the insert-receiving grooves 27 and 27' as the pressure in the mold cavity is increased.

This results in that low-quality products are made. With this mold, however, the second and following molding cycles give satisfactory products with a minimum of flashing. When the mold is opened after the first introduction of synthetic resin has solidified, the flash or the portion filled in the clearances formed along the parting line of the mold and around the inserts 26 remains on the upper mold section 21 forming raised portions 34 and 34' of the flash restrainers 31 and 31', which are actually blocks of synthetic resin set in the T-slots 28 and 28'.

The flash restrainers 31 and 31' are apparently T-shaped in cross section and are thus firmly held in the upper mold section against dislocation. They are formed generally flush with the face 30 of the upper mold section or protrude to an extremely limited extent. They may also be formed separately in advance to the molding operation but are preferably formed during the first molding cycle simultaneously with the formation of the desired product, as described hereinbefore. The mid portions 34 and 34' of the flash restrainers 31 and 31' are raised to closely engage with the inserts 26 received in the grooves 27 and 27' formed in the lower mold section 24 when the upper section 21 is placed thereon, thereby to restrain any substantial flashing of the molten resin along the walls of the insert-receiving grooves.

Though in the illustrated mold the flash restrainers 31 and 31' are arranged adjacent to the cavity 22 in positions along its sides formed with insert-receiving grooves 27 and 27' where flashing is relatively heavy, they may be formed around the entire periphery of the cavity recess 22 to further increase their flash-restraining effect. Any flashing of molten resin is limited to the extent of the spaces 35 and 35' between the recess 22 and flash restrainers 31, 31' and never proceeds further to detract from the quality of the product as in the example shown in FIG. 1. In this manner, the product obtained by use of the mold embodying the present invention has only a minimized flash 32 around the periphery of the molded section 33, as shown in FIG. 2. A further advantage of the present invention is that, even if the flash restrainers 31 and 31' including raised portions 34 and 34' were partly broken during the molding operation, the broken portion would be replenished immediately in the following molding cycle to maintain the effectiveness of the flash restrainers.

According to the present invention, it will be appreciated from the foregoing description that the flashing of molding material is effectively minimized by the arrangement of the flash restrainers in one of the mold halves in closely spaced parallel relation to the adjacent peripheral edges of the cavity recess formed in the mold half and accordingly the molded product can be finished without any need of substantial work for removal of flash.

While a particular embodiment of the present invention has been shown and described, it is apparent that changes and modifications may be made without departing from the invention in its broader aspects. The aim of the appended claim, therefore, is to cover all such changes and modifications as fall within the scope of the invention.

What is claimed is:

1. A method of molding plastic objects with a two-piece metal mold having a cavity and insert-receiving grooves communicating therewith comprising the steps of positioning inserts within the insert-receiving groove of the two-piece metal mold, characterized by the fact that one of the mold sections is formed with slots, T-shaped in cross section, and spaced by a predetermined distance from the peripheral wall of the mold cavity;

filling said T-shaped slots with a hardenable material to form flash-restraining members;

injecting molten synthetic resin material into the mold cavity to embed the insert and thus minimize the formation of flash projecting along the parting line of the mold and along said insert-receiving grooves formed therein;

and removing the resulting article from the mold.

No references cited.

ROBERT F. WHITE, *Primary Examiner.*

J. HOWARD FLINT, JR., *Examiner.*

J. H. SILBAUGH, *Assistant Examiner.*